April 24, 1962 J. Z. DE LOREAN 3,031,204
VEHICLE SUSPENSION WITH LOAD SIMULATING LEVELING DEVICE
Filed Nov. 19, 1959 2 Sheets-Sheet 1
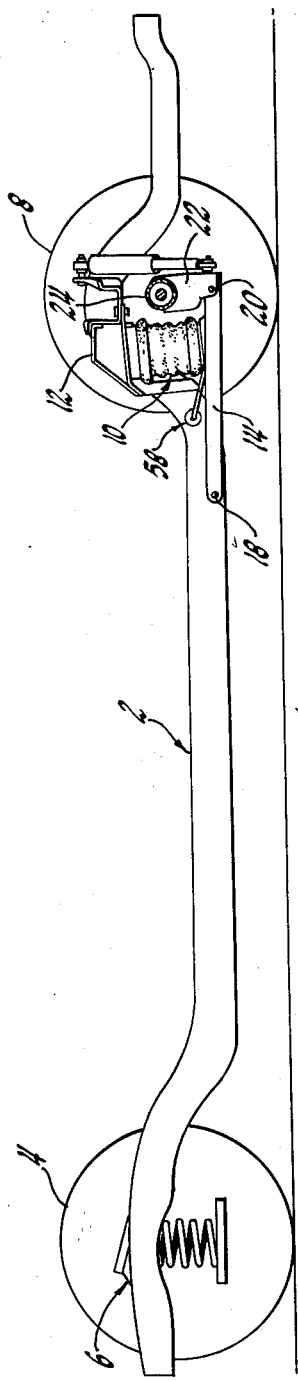
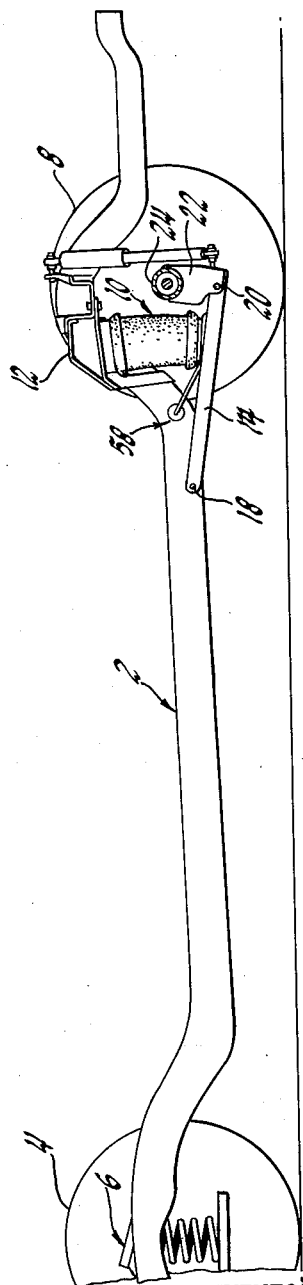
INVENTOR.
John Z. DeLorean
BY
W. F. Wagner
ATTORNEY April 24, 1962  J. Z. DE LOREAN  3,031,204
VEHICLE SUSPENSION WITH LOAD SIMULATING LEVELING DEVICE
Filed Nov. 19, 1959  2 Sheets-Sheet 2

TO ENGINE VACUUM  TO ATMOSPHERE

INVENTOR.
John Z. DeLorean
BY
W. F. Wagner
ATTORNEY

United States Patent Office 3,031,204
Patented Apr. 24, 1962

3,031,204
VEHICLE SUSPENSION WITH LOAD SIMULATING LEVELING DEVICE
John Z. De Lorean, Birmingham, Mich., assignor to General Motors Corporation, Detroit, Mich., a corporation of Delaware
Filed Nov. 19, 1959, Ser. No. 854,096
1 Claim. (Cl. 280—124)

This invention relates to vehicle suspension and more particularly to suspension of the type wherein the sprung mass of the vehicle is maintained at a constant road clearance throughout a substantial range of variation in load imposed thereon.

Throughout virtually the entire history of the automobile industry, vehicle suspension has been based upon utilization of the elastic properties of steel in the form of leaf, coil, or torsion springs. An inherent characteristic of such springs is that they possess a constant rate, rate being defined as the change of load per unit deflection. Because of this characteristic, the sprung mass of vehicles utilizing steel springs changes attitude with each change in load or change in load distribution, with the result that not only the appearance of the vehicle, but more importantly, carefully calculated suspension geometry is adversely affected under all conditions other than the artificial case defined as design load. In the early days of automobile production, this problem was more theoretical than real, owing to the fact that a typical vehicle exhibited a low ratio of loaded to unloaded weight, and utilized comparatively stiff or high rate springs. However, in recent years, the desire for greater passenger comfort has led to progressively softer springing coupled with extremely limited road clearance, both of which aggravate the problem described.

Although various proposals have been advanced in the prior art to solve the complex problem presented, in general such proposals have involved either the addition of helper springs which are brought into operation to augment the lifting force of the primary spring after predetermined deflection of the latter, or are based upon stressing the primary springs nearer to their elastic limits. In the former case, serious difficulties arise in the form of cost and complexity of the operating mechanism for the springs. In addition, such helper springs are only partially satisfactory, owing to the fact that the fundamental problem remains unchanged through the range of load deflection up to the point at which the helper spring is brought into play. In the latter case, the solution tends to create more difficulties than it corrects, since overstressing of the primary spring either hastens elastic fatigue, or causes the spring to reach its mechanical limits of deformation under compression load, with the result that the vehicle tends to bottom or "strike through" when negotiating relatively small irregularities.

The present invention is concerned with providing reliable, efficient, and economical means for maintaining the sprung mass of vehicles equipped with a constant rate primary spring at a predetermined design height and in a level attitude throughout a range of sprung mass loading extending from the completely unloaded condition continuously through a selected maximum passenger load.

An object of the invention is to provide a suspension system incorporating improved leveling means.

A further object is to provide a suspension arrangement of the type described characterized by "fail safe" operation, such that in the event of failure of the leveling means, the primary elastic medium exerts supporting force on the sprung mass greater than normal rather than less.

A further object of the invention is to provide a vehicle suspension system incorporating constant rate elastic medium which is adapted to support the vehicle sprung mass in a level attitude at a predetermined height under conditions of maximum load, wherein additional elastic means are provided which exert a force opposing the force of the constant rate elastic medium proportional to decrease in loading of the sprung mass, thereby simulating the maximum load regardless of the actual sprung load.

Still another object is to provide an arrangement of the stated character wherein the opposing force is generated by a variable rate spring controlled by height sensing mechanism disposed between the unsprung mass of the vehicle and the suspension structure therefor.

A still further object is to provide an arrangement of the stated character wherein the additional elastic means utilizes subatmospheric pressure to generate the variable opposing force.

Yet another object is to provide an arrangement of the stated character wherein the primary elastic medium is a coil spring disposed between a spring seat on the sprung mass and a spring seat associated with the unsprung mass, wherein the coil spring is surrounded by a cylindrical flexible tubular element having its opposite ends connected in fluid tight engagement with the respective spring seats so as to form a closed chamber, which chamber is subjected to varying levels of subatmospheric pressure by control means operating responsive to vertical displacement of the sprung mass.

Still a further object is to provide an arrangement of the type described wherein the cylindrical flexible member is relatively thin in cross section and embraces the coil springs so that the latter provides radial stability to the former.

These and other objects, advantages, and features of the invention will become more fully apparent as reference is had to the accompanying specification and drawings wherein:

FIG. 1 is a schematic side elevational view of a vehicle utilizing suspension structure in accordance with the invention, the vehicle being shown in the attitude which it maintains throughout the normal range of passenger loading when the device is operating;

FIG. 2 is a view similar to FIG. 1 illustrating the vehicle attitude which occurs in the event of failure of the leveling device;

Figure 3:
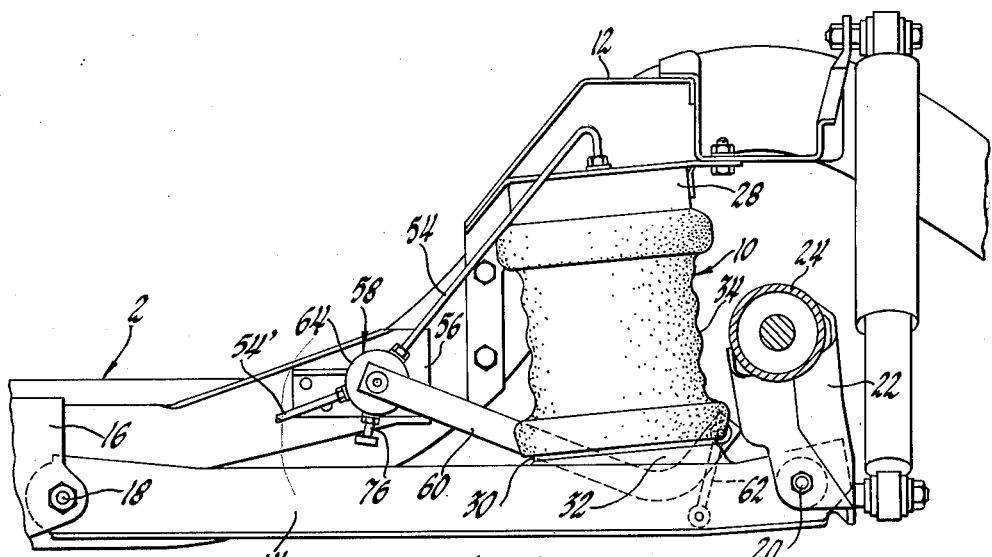
FIG. 3 is an enlarged fragmentary view of the spring assembly shown in FIGS. 1 and 2.

Referring now to the drawings and particularly FIG. 1, there is shown schematically a portion of a vehicle chassis in which the reference numeral 2 designates generally the vehicle frame or sprung mass. Sprung mass 2 is supported at its forward end relative to front wheel 4 by means of a conventional suspension structure 6. The rearward end of sprung mass 2 is supported relative to rear wheel 8 by means of a composite spring assembly 10 which is disposed between a frame mounted support 12 and a longitudinally intermediate portion of a trailing arm suspension link 14. As seen best in FIG. 3, the forward end of link 14 is connected to frame bracket 16 by a pivot shaft 18 while the rearward end thereof is connected by a pivot shaft 20 to a depending bracket 22 mounted on axle 24. It will be understood that the structure and arrangement of suspension elements for both the front and rear at the lateral opposite side of the vehicle is identical to that just described.

Figure 4:
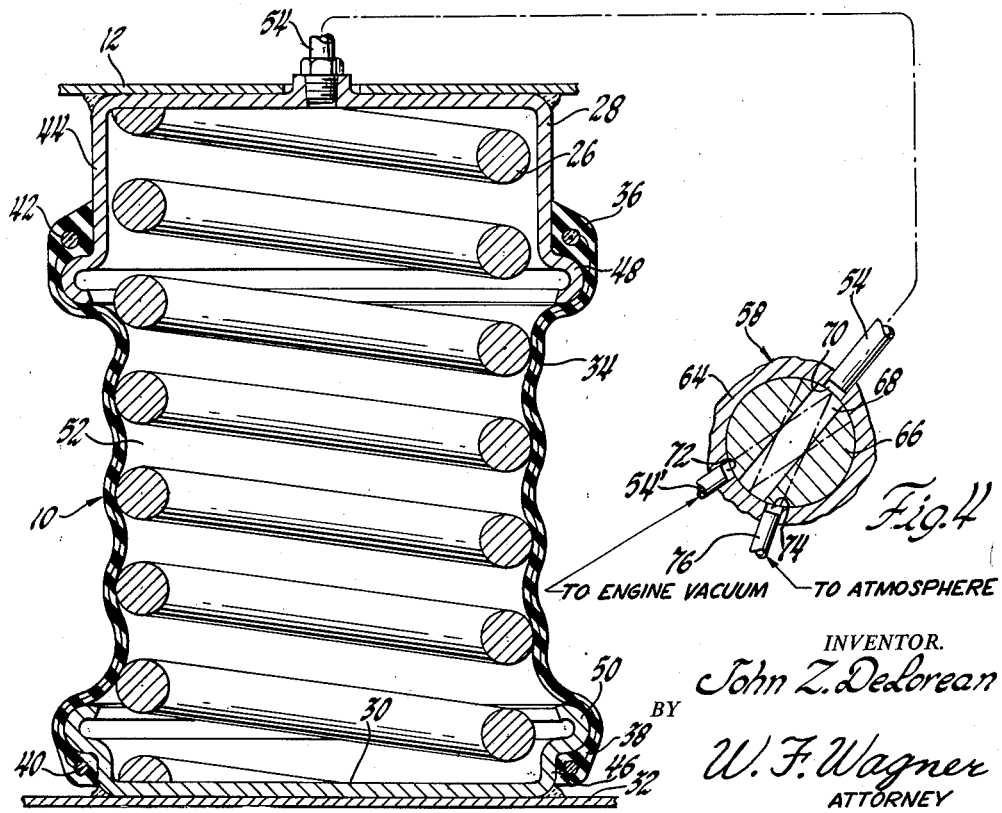
FIG. 4 is a greatly enlarged sectional elevational view illustrating the details of construction of a spring assembly in accordance with the invention, together with the control device associated therewith.

As seen best in FIG. 4, composite spring assembly 10 comprises a coil spring 26 which is disposed in compression between an inverted cup-shaped spring seat 28 affixed to frame mounted support 12 and a cup-shaped lower spring seat 30 affixed to a platform 32 formed on the upper surface of trailing suspension link 14 near its rearward end. In accordance with one feature of the invention, spring 26 is formed and dimensioned so as to provide a spring rate such that it will support the sprung mass 2 in a horizontal level attitude at a predetermined vertical level when the sprung mass is subjected to a selected maximum passenger and cargo load. Since coil springs of uniform cross section exhibit constant rate behavior, it will be apparent that whenever passenger and cargo loading of the sprung mass is less than the selected maximum, frame 2 will ascend relative to rear wheel 8 and cause the sprung mass to assume an inclined attitude as illustrated in FIG. 2. However, according to another feature of the invention, coil spring 26 is surroundingly embraced by a vertically extending flexible tubular member 34. Member 34 is preferably formed of a non-stretching laminate of fabric and elastomer having enlarged circumferential beads 36 and 38 in which are embedded reinforcing wires 40 and 42. Beads 36 and 38 grip the peripheral walls 44 and 46 of cup-shaped spring seats 28 and 30 to provide fluid tight sealing engagement therewith. To assist in effecting fluid tight engagement and prevent mechanical separation, the mouth of each cup member 28 and 30 forms a radially outwardly bulged flange 48 and 50 of semi-circular cross section which forms annular shoulders resisting downward displacement of bead 36 and upward displacement of bead 38, respectively. It will thus be seen that flexible tubular member 34 cooperates with cup-shaped spring seats 28 and 30 to form a fluid tight cavity 52 totally enclosing coil spring 26. According to the invention, cavity 52 is subjected to subatmospheric pressure via conduit 54—54' which communicates with a suitable source of vacuum, such as for example the vehicle power plant intake manifold, not shown. Mounted on a frame supported bracket 56 and interposed in conduit 54 is a control valve 58 which is operated by a vertically swingable lever 60. Lever 60 is connected to suspension link 14 by a link 62 and responds angularly to variation in vertical displacement between upper spring seat 28 and lower spring seat 30 in such a way that increase in vertical displacement beyond the predetermined displacement required to maintain the vehicle sprung mass in a level attitude permits the control valve to move to a position allowing introduction of subatmospheric pressure into cavity 52 until the level of vacuum therein is sufficient to counteract the excess energy of spring 26 seeking to lift the sprung mass above the predetermined level. While any suitable control valve may be utilized, in the illustrated embodiment as seen best in FIG. 4, valve 58 takes the form of a cylindrical casing 64 in which is disposed a rotor element 66 which is operatively connected to lever 60. Rotor 66 has a single transverse passage 68 extending therethrough, while casing 64 is provided with three ports 70, 72, and 74 which are angularly oriented so that the transverse passage 68 is blocked by the casing wall when the displacement of the sprung mass is at the predetermined level desired. However, as will be evident from the two alternate positions of passage 68 shown in dotted lines, upward displacement of the sprung mass, previously described, causes clockwise rotation of rotor element 66 to a position establishing communication between the source of vacuum and cavity 52 while downward displacement of the sprung mass from the desired level causes rotor element 66 to move counterclockwise and establish communication between cavity 52 and atmosphere intake 76, thereby allowing atmospheric pressure to bleed into cavity 52 and eliminate the counteracting force opposing the lifting effect exerted by coil spring 22.

In addition to the operation of the invention hereinbefore described, additional benefits are obtained which are not apparent upon superficial consideration. Paramount among these is the influence of the composite spring under conditions of ride deflection wherein the frequency of deflection is sufficiently rapid that the time interval, during which the leveling valve 58 is open or closed, produces little, if any, influence upon the level of subatmospheric pressure in the cavity 52. Under the circumstances noted, the cavity 52 may be regarded as completely sealed at a specified subatmospheric pressure when the coil spring 26 has been compressed to the predetermined displacement necessary to maintain the sprung mass at the desired level. Since at this time the actual rate of the composite spring is the difference between the positive rate of the coil spring and the negative rate of the fluid spring, it will be seen that upon further compression of the composite spring, the cavity 52 will become progressively smaller and thereby cause the subatmospheric pressure to more nearly approach external atmospheric pressure. This being the case, further compression deflection of the spring will be characterized by an overall increase in spring rate since the difference between the positive rate of the coil spring and the decreasing negative rate of the fluid spring will become progressively smaller. Therefore, the composite spring will function to some extent as a variable rate spring in which the rate progressively increases as the suspension approaches the bump position. It will, of course, be evident that in the case of rebound deflection of short duration, the total volume of the cavity 52 will increase with the result that the internal subatmospheric pressure will tend to produce a higher level of vacuum which will operate to increase resistance to rebound deflection.

From the foregoing it will be seen that a novel and improved suspension has been provided. The device is not only extremely simple and inexpensive, but in addition affords the extremely important advantage of inherently preventing disablement of the vehicle in the event of failure of the device. Furthermore, the device is readily adaptable to conventional coil spring suspensions with minor modification of elementary nature.

While but one embodiment of the invention has been shown and described, it will be apparent that other changes and modifications may be made therein. It is, therefore, to be understood that it is not intended to limit the invention to the embodiment shown, but only by the scope of the claim which follows.

What is claimed is:

A suspension spring assembly comprising in combination, a coil spring, a pair of opposed cup-shaped spring seats engaging opposite ends of said coil spring, a cylindrical flexible member surrounding said coil spring to form a closed cavity, said flexible member being formed with enlarged beads which tightly embrace the peripheral walls of said spring seats and said peripheral walls terminate in circumferential radially outwardly bulged flanges forming endwise abutments for said beads, means connecting said cavity with a source of subatmospheric pressure, and valve means in said last mentioned means operative to introduce subatmospheric pressure into said cavity upon increase in displacement of said spring seats beyond a predetermined limit and to introduce atmospheric pressure into said cavity upon decrease in said displacement beyond said predetermined limit.

References Cited in the file of this patent

UNITED STATES PATENTS

| 2,427,927 | Schutte | Sept. 23, 1947 |
| 2,790,650 | Boschi | Apr. 30, 1957 |

FOREIGN PATENTS

| 22,140 | Great Britain | Oct. 14, 1904 |
| 305,312 | Great Britain | Feb. 7, 1929 |